United States Patent [19]

Halvarsson

[11] 4,137,642
[45] Feb. 6, 1979

[54] TOOL FOR CONTROL MEASUREMENT OF GEARS

[75] Inventor: Harald Halvarsson, Finsporg, Sweden

[73] Assignee: Stal-Laval Turbin AB, Finsporg, Sweden

[21] Appl. No.: 851,314

[22] Filed: Nov. 14, 1977

[30] Foreign Application Priority Data

Nov. 12, 1976 [SE] Sweden .................................. 7612633

[51] Int. Cl.² .................................................. G01B 5/20
[52] U.S. Cl. ................................................. 33/179.5 D
[58] Field of Search ................... 33/179.5 R, 179.5 A, 33/179.5 D, 179.5 E

[56] References Cited

U.S. PATENT DOCUMENTS

2,394,623  2/1946  Martin .............................. 33/179.5 R
2,761,560  9/1956  Pomernacki ..................... 33/179.5 R

FOREIGN PATENT DOCUMENTS

601612  8/1934  Fed. Rep. of Germany ..... 33/179.5 R

Primary Examiner—Richard R. Stearns
Attorney, Agent, or Firm—Pollock, Vande Sande & Priddy

[57] ABSTRACT

The invention relates to a tool for control measurement of the correct form of the teeth of helical gear wheels. A rack with the same pitch as the wheel to be control-measured rolls on top of the wheel in engagement with its teeth. An indicator whose height is adjustable has a measuring arm passing through a hole in the rack, so that its point slides on the side of a tooth on the gear wheel. The relative height of the indicator in relation to the rack is recorded.

2 Claims, 4 Drawing Figures

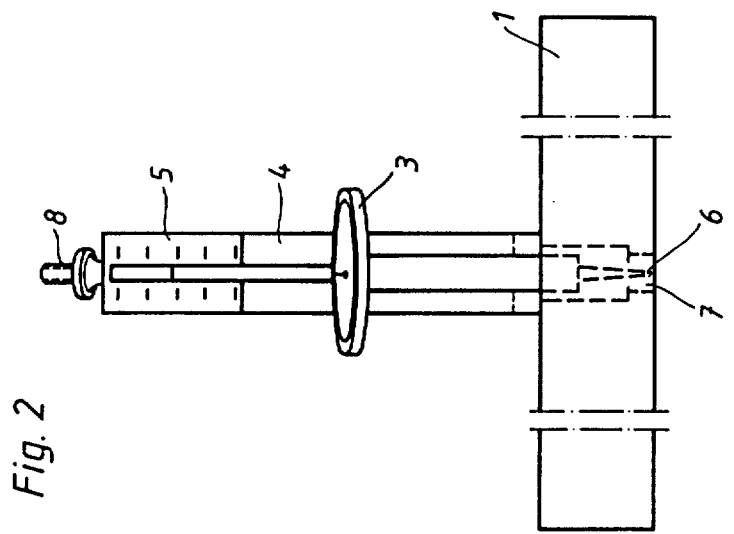
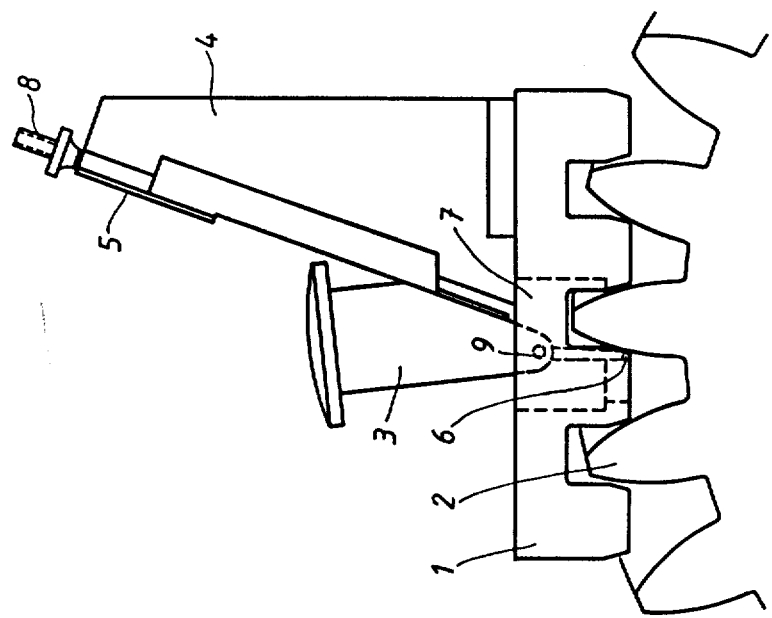

TOOL FOR CONTROL MEASUREMENT OF GEARS

SUMMARY OF THE INVENTION

The present invention relates to a tool for control measurement of helical gears.

In order to obtain correct gear wheel engagement and thus secure vibration-free and silent running as well as minimum wear, the shape of the teeth of the different gear wheels must be correct, i.e., the sides of the teeth must follow an exact involute form. This form, however, is rather complicated, and it is therefore difficult both to produce and to control it.

The present invention is based on the recognition that a straight rack may be caused to roll continuously on a helical gear wheel and, according to the invention, if the rack is thereafter provided with a dial test indicator, the point of the measuring arm of the indicator, if free, will sense the tooth form at various levels as the rack rolls on the gear wheel.

BRIEF DESCRIPTION OF THE DRAWING

The invention will be described in greater detail with reference to the accompanying drawings showing a tool according to the invention placed on a gear wheel, in which:

FIG. 1 is an elevation in the axial direction of the wheel;

FIG. 2 is an elevation perpendicular to that of FIG. 1; and

DESCRIPTION OF A PREFERRED EMBODIMENT

Figure 3:
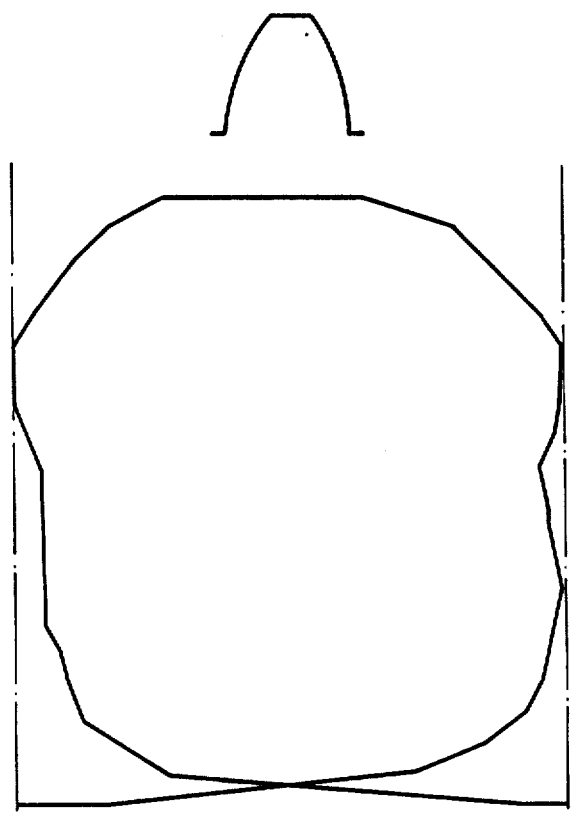
FIG. 3 shows the measurement results for a tooth in diagram form.

The basic element of the involute measuring device is a rack 1 with the same pitch as the gear wheel(s) to be control-measured. Because the teeth on a rack have straight sides, the rack may be manufactured and controlled with great accuracy by conventional methods.

The rack 1 is intended to roll on the gear wheel 2 in engagement with the teeth thereon.

A dial test indicator 3 attached to the rack by a bracket 4 is used as a measuring instrument. By means of an adjusting screw 8, the height of the dial test indicator can be varied, and this height in relation to the rack is recorded on a scale 5. The side of bracket 4 has the same inclination as the angle of thread of the teeth of the rack, so that the indicator is adjusted in a direction parallel to the tooth flank.

The indicator is provided with a measuring arm 6 which passes down through a hole 7 in the rack and the measuring point of which slides on the side of a tooth on the gear wheel.

Since rack 1 rolls freely on gear wheel 2, its degree of setting into the gear wheel is determined by the form and the width of its teeth. In principle, the form is a given, since the teeth of the rack must have the same angle of thread as the cutting tool by which the gear has been produced. The width of the teeth of the rack should be such that the oblique tooth flanks of the rack are constantly rolling on the pitch circle of the gear, and therefore the teeth of the rack are truncated, as shown, so that the flanks of the teeth are limited to their active part.

The continuous rolling of the rack of the helical gear wheel is best understood if both the gear and the rack are conceived to be extended in the axial direction so that the structure is that of a grooved or toothed plane rolling on a helical cylinder. At least two of the teeth of the rack will then be permanently guided simultaneously in two corresponding adjacent gaps between the teeth of the wheel. Accordingly, in order to secure continuous rolling, the wheel must have a width in relation to the tooth angle such that the ends of adjacent teeth overlap each other in the peripheral direction. For operational reasons, this condition is normally already fulfilled in the case of helical gear wheels.

Measurement of a tooth is performed by vertically adjusting indicator 3 by means of adjusting screw 8, so that the measuring point on arm 6 is displaced from the top of the tooth to its bottom. For each grading of scale 5, the rack is allowed to roll somewhat on the gear wheel and the deflection of the indicator is read. The principle of this operation will now be explained.

The rack is assumed to be in the neutral position shown and the indicator is then placed in such a vertical position, so that the point of measuring arm 6 abuts the cog of the wheel at the point of contact between wheel cog and rack tooth, which point is located on the pitch circle of the wheel. For the purpose of this hypothesis, we disregard the fact that the rack at this very point is bored through to permit passage of the measuring arm, so said point of contact does not actually exist. If the rack is now allowed to roll somewhat back and forth about this location, said point of contact will be displaced only to a rather small extent, and measuring arm 6 hardly changes its location in relation to the rack, so that the deflection of the indicator remains constant.

If, thereafter, the indicator is somewhat displaced upwards or downwards, measurement point 6 will move obliquely downwards to the right because of the rounded form of the wheel tooth. If, thereafter, the rack is allowed to roll a little back and forth, measurement point 6, without sliding to any substantial extent on the wheel tooth, will move perpendicular to the surface defined by the inclined flank of the rack, said surface being parallel to the side of bracket 4. The movement of point 6 is limited by the surface of the wheel tooth and, if this is a correct involute surface, the limit position of the point will represent a situation where the flank surface of the rack touches the wheel tooth at the position where point 6 makes contact with the wheel tooth. In that case, the deflection of the indicator at this limit position will become equal to the above-mentioned deflection where the point of the measuring arm 6 touched the wheel tooth at the pitch circle. If, on the other hand, the wheel tooth deviates from an involute form, the deflection at the limit position will vary in the two cases. See also below under FIG. 4.

By adjusting the indicator at various levels in relation to the rack and reading the deflection of the limit position point by point, an exact picture of the tooth surface of the wheel tooth may be obtained. If the deflections are illustrated in a diagram as shown in FIG. 3, an exact involute form will result in a rectilinear diagram.

The upper portion of FIG. 3 shows the approximate tooth form. The lower portion shows in substantially enlarged scale the deflection of the indicator at different height adjustments of the indicator on both sides of the tooth. In this figure the ordinate thus corresponds to the height adjustment of the indicator, whereas the abscissa indicates the deflection of the indicator with regard to the limit position.

It can be seen that the curve at the middle portion of both sides of the tooth lies quite close to a vertical line, whereas the upper and lower parts of the curve are positioned far back from this line. This is due to the fact that normally the tooth form is corrected so that the surface of the tooth is ground down somewhat at its tip and root to relieve the tooth of wear at these points. In this way the teeth, when subjected to wear, will at least in the first place approach the correct involute form instead of departing from this form.

Since the same tooth form can be found in all teeth with only very slight deviation, it is normally sufficient to measure one tooth or possibly a few teeth distributed around the wheel.

The same measuring tool can be used for different gear wheels which are to work in engagement with each other, that is, which have the same pitch, independent of whether they are right-hand or left-hand helical gears. On the other hand, if gears having different pitch are to be measured, the rack must be replaceable, for example by being screwed to bracket 4.

Figure 4:
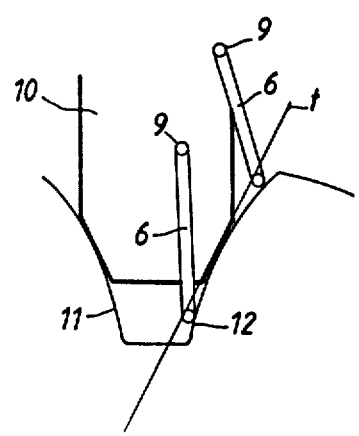
FIG. 4 is a sketch illustrating the principle of the invention.

The principle may be better understood from FIG. 4 showing the rack tooth 10 in its central position between two wheel cogs 11, 12 and showing two different level positions of the measuring arm 6 which is pivoted at point 9, see also FIG. 1. One flank of the tooth 10 is prolonged in a tangential line t. When the rack is rolled on the wheel in one or the other direction, the shown section of the tooth 10 will — according to the influence of the mutual engagement of the other teeth of the rack and the wheel — be lifted upwards to the right or the left and the tangential line t will still touch the tooth 12, the tangential point at the same time moving upwards or downwards, respectively, provided that the tooth form is correct.

Thus, the point of the arm 6 will move against line t and have its limit position on this line if the tooth form is correct. In case of deviations in the form of tooth 12, the line t may interest the surface of tooth 12 or go free from it, which means that the limit position of the point of the arm will not always lie on line t, so the limit deflection of the indicator will not be constant in all levels of the indicator in relation to the rack.

What is claimed is:

1. A tool for control measurement of the correct involute form of the teeth of a helical gear wheel, comprising
    (a) a dial test indicator mounted for movement along a linear path;
    (b) a pivotally movable measuring arm having a point thereon, on said dial test indicator;
    (c) a rack having the same pitch as the teeth of said helical gear wheel;
    (d) a bracket including means defining said linear path on which said dial test indicator is so located in relation to the teeth of said rack that, during measuring, the point of said measuring arm engages a tooth of said helical gear wheel; said bracket having an aperture therein permitting said point of said measuring arm to contact said tooth;
    (e) means for mounting said bracket on said rack;
    (f) said dial test indicator being adjustably mounted on said bracket, whereby the height position of the point of said measuring arm can be varied in relation to said rack, and the track for the movement of said dial test indicator has the same inclination as the angle of thread of said rack.

2. A tool according to claim 1, wherein the teeth of said rack are truncated and have a width at the approximate center of their oblique flank surfaces substantially equal to the distance between the teeth of the said helical gear wheel at its pitch circle.

* * * * *